June 19, 1923.

A. J. CHARLTON

COMBINED COOLING AND CARBURETING SYSTEM FOR INTERNAL COMBUSTION ENGINES

Filed Aug. 16, 1920

1,458,974

INVENTOR
A. J. Charlton
BY Munn & Co.
ATTORNEYS

Patented June 19, 1923.

1,458,974

UNITED STATES PATENT OFFICE.

ALBERT JOHN CHARLTON, OF LOWDEN, IOWA.

COMBINED COOLING AND CARBURETING SYSTEM FOR INTERNAL-COMBUSTION ENGINES.

Application filed August 16, 1920. Serial No. 403,669.

*To all whom it may concern:*

Be it known that I, ALBERT J. CHARLTON, a citizen of the United States, and a resident of the city of Lowden, in the county of Cedar and State of Iowa, have invented a new and useful Improvement in Combined Cooling and Carbureting Systems for Internal-Combustion Engines, of which the following is a full, clear, and exact description.

My invention relates to improvements in combined cooling and carbureting systems for internal combustion engines, and it consists in the combinations, constructions and arrangements herein described and claimed.

An object of my invention is to provide a cooling system which may be applied to any engine having the usual water jacket, but which dispenses with the use of water, thereby obviating any danger of stoppage of the water system, also reducing the weight and eliminating the necessity of a radiator.

A further object of my invention is to provide a combined cooling and carbureting system in which cold air is forced through the water jacket, and the air which has been heated thereby is conveyed to the carburetor in a heated condition, thus adding to the efficiency of the carburetor.

Other objects and advantages will appear in the following specification and the novel features of the invention will be particularly pointed out in the appended claims.

My invention is illustrated in the accompanying drawings, forming part of this application in which—

Figure 1:
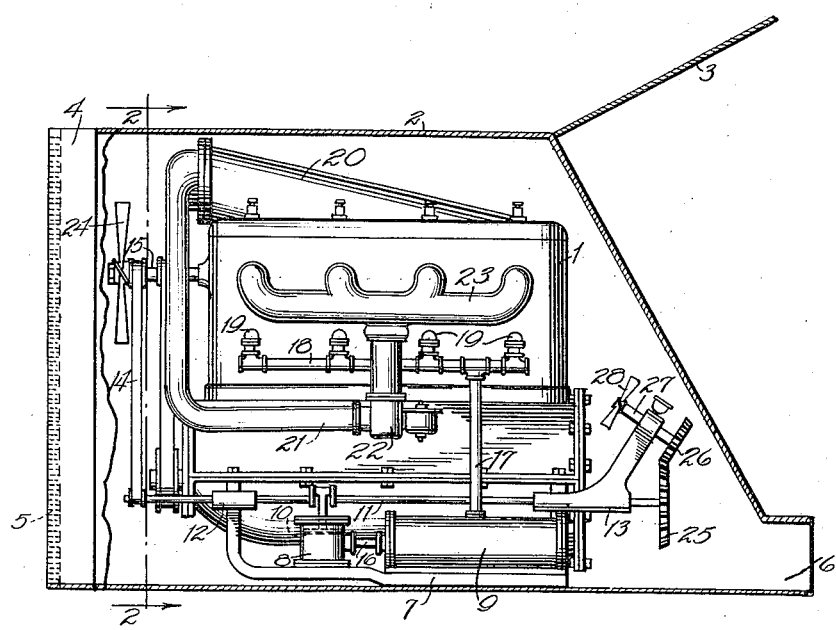
Figure 2:
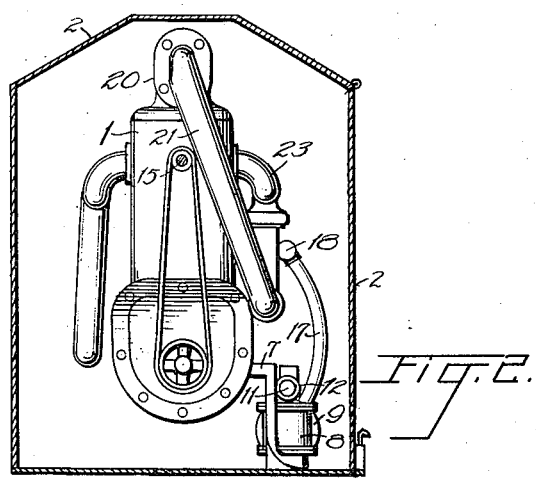

Figure 1 is a side view of the device, the outer casing being shown in section, and Figure 2 is a section along the line 2—2 of Figure 1.

In carrying out my invention, I may make use of any form of internal combustion engine. The invention is primarily designed for automobile engines. In the drawings, 1 indicates a four cylinder engine which is provided with the usual water jacket. The engine is disposed within a casing 2, which may form a part or continuation of the hood 3, or may be separate therefrom and enclosed thereby, as desired. At the front of this casing 2 is a frame 4 having a honeycomb front 5, this frame taking the place of the ordinary water cooled radiator. The rear end of the casing 2 is provided with an opening 6, through which air drawn in at the front of the casing, may be discharged. I have indicated the casing diagrammatically and it will be understood that provision is made for extending the engine shaft through the casing wall and for the usual throttle and timer control rods, not shown.

Secured to the engine frame is a bracket 7 upon which is mounted an air compressor 8 and a pressure tank 9. The piston 10 of the air compressor is driven by means of a shaft 11 which is journalled in bearings 12 and 13. The shaft 11 is preferably driven by means of a belt 14 from the fan shaft 15. As will be seen from the drawings the air compressor and the pressure tank are connected by a pipe 16. A pipe 17 leading from the pressure tank, communicates with a pipe 18 which in turn communicates with the inlet pipe 19 leading into the water jacket of the engine. At the top of the engine the outlet pipe 20 which ordinarily serves for conveying water, is connected by means of a pipe 21 with the carburetor 22 which in turn is connected with the intake manifold 23.

The shaft 15 is provided with a fan 24, while the shaft 11 is provided with a gear 25 meshing with another gear 26 on a stub shaft 27 which is journalled in an extension of the bearing 13 and which is provided with a suction fan 28.

From the foregoing description of the various parts of the device the operation thereof may be readily understood. When the engine is operated the air is drawn through the frame 4 by the fan 24 and blown over the exterior of the engine toward the rear. The fan 28 also aids in causing a current of air to pass through the casing and to be discharged at the opening 6, thus cooling the exterior of the engine. Air also enters the air compressor 8, which when operated, forces air into the pressure chamber or reservoir 9 from whence it passes into water jacket by means of the inlet pipes 19. After circulating through the water jacket it passes through the pipes 20 and 21 into the carburetor and thus to the intake manifold. It will be understood that the air which is passed through the water jacket is heated and tends to raise the temperature of the gaseous fuel to a point where it is more readily ignited than is a cooler mixture. Thus it will be seen that I have provided means by which the engine is cooled and at the same time the efficiency of the carburetor is increased.

It will be noted that when the air is compressed it is cooled the pressure tank being within the casing and subjected to the cool air passing through the latter. When this compressed air enters the water jacket it expands and thus absorbs more heat from the engine.

While, I have described air as entering the water jacket or air jacket under pressure, at one side of the engine, it will be obvious that it might be introduced at any point or points where the most efficient cooling of the engine will be found in practice.

My invention in its broadest aspects also contemplates the elimination of the air compressor and the pressure tank. In other words the broad feature of the invention is to cool the engine and to make use of the air which passes through the water jacket or the air jacket, in connection with the carburetor. This of course might be accomplished merely through the suction effected by the intake stroke of the pistons.

In such case, the air in the casing 2 would be drawn directly into the air jacket at the openings which in the drawings receive the pipe 19, without being compressed. The arrangement shown, however, is at present the preferred form of the invention.

I claim:

1. The combination with an internal combustion engine having a cooling jacket, a carburetor and an auxiliary shaft, of a compression tank, an air compressor for maintaining air under pressure in said tank, said compressor being operatively connected with said auxiliary shaft, a plurality of contracted inlets, one connected to each cylinder portion of said cooling jacket and communicating with said compression tank, and a relatively large discharge pipe communicating with the upper part of said cooling jacket and connected to the air intake port of said carburetor.

2. In a combined cooling and carbureting system for internal combustion engines, an engine having cylinders, a cooling jacket, an auxiliary shaft, a carburetor, and an intake manifold connecting said carburetor with said cylinders, a compression tank, an air compressor operatively connected with said auxiliary shaft for maintaining air under pressure in said tank, a plurality of contracted inlets, one connected to each cylinder portion of said cooling jacket and communicating with said pressure tank, a discharge pipe communicating with the upper part of said cooling jacket and connected to the air duct of said carburetor, and a suction fan operatively connected with said auxiliary shaft and disposed at the rear of said engine.

ALBERT JOHN CHARLTON.